Figure 1:
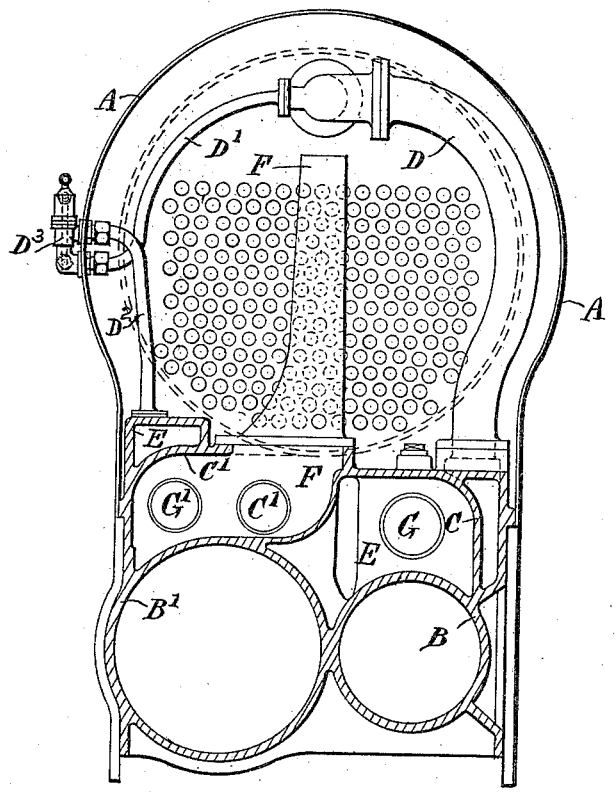

(No Model.) 7 Sheets—Sheet 1.

W. M. SMITH.
COMPOUND ENGINE.

No. 464,833. Patented Dec. 8, 1891.

Witnesses.
E. E. Duffy
H. E. Peak.

W. M. Smith
Inventor
per O. E. Duffy
Atty

THE NORRIS PETERS CO., PHOTO-LITHO., WASHINGTON, D. C.

(No Model.) 7 Sheets—Sheet 2.
W. M. SMITH.
COMPOUND ENGINE.
No. 464,833. Patented Dec. 8, 1891.
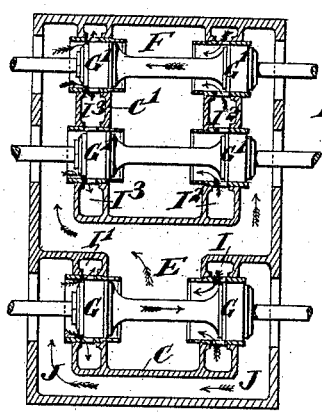
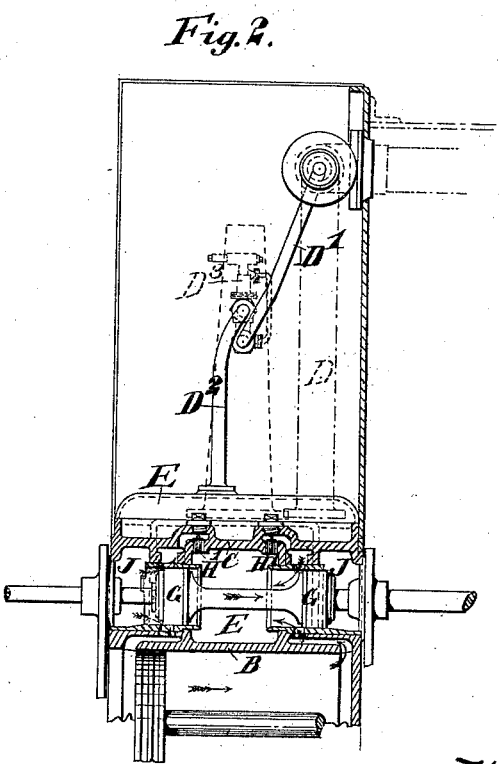

(No Model.) 7 Sheets—Sheet 3.
W. M. SMITH.
COMPOUND ENGINE.
No. 464,833. Patented Dec. 8, 1891.
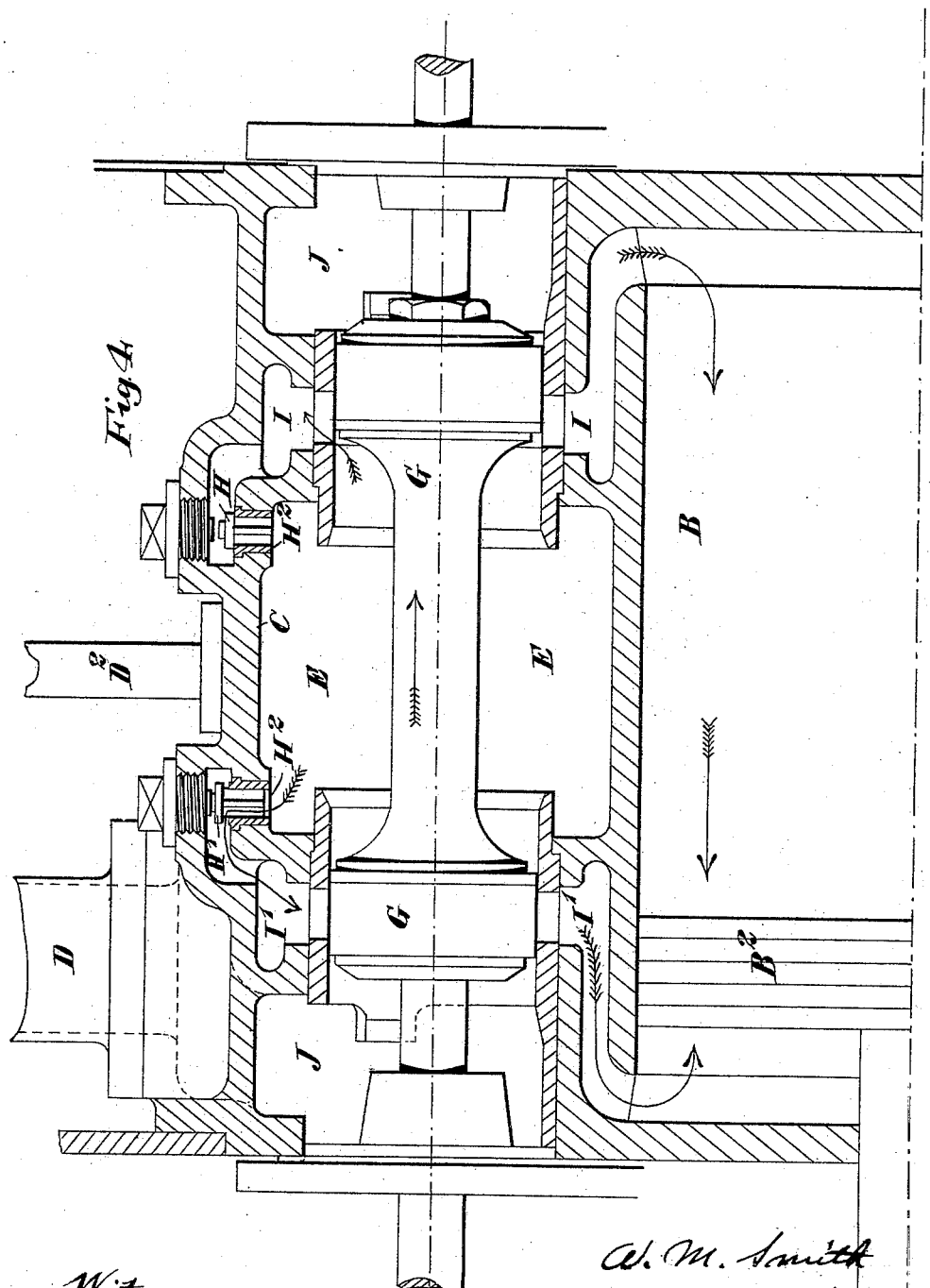
Witnesses
E. C. Duffy
H. A. Weeks
W. M. Smith
per Inventor
C. E. Duffy
Atty (No Model.) 7 Sheets—Sheet 4.
W. M. SMITH.
COMPOUND ENGINE.
No. 464,833. Patented Dec. 8, 1891.
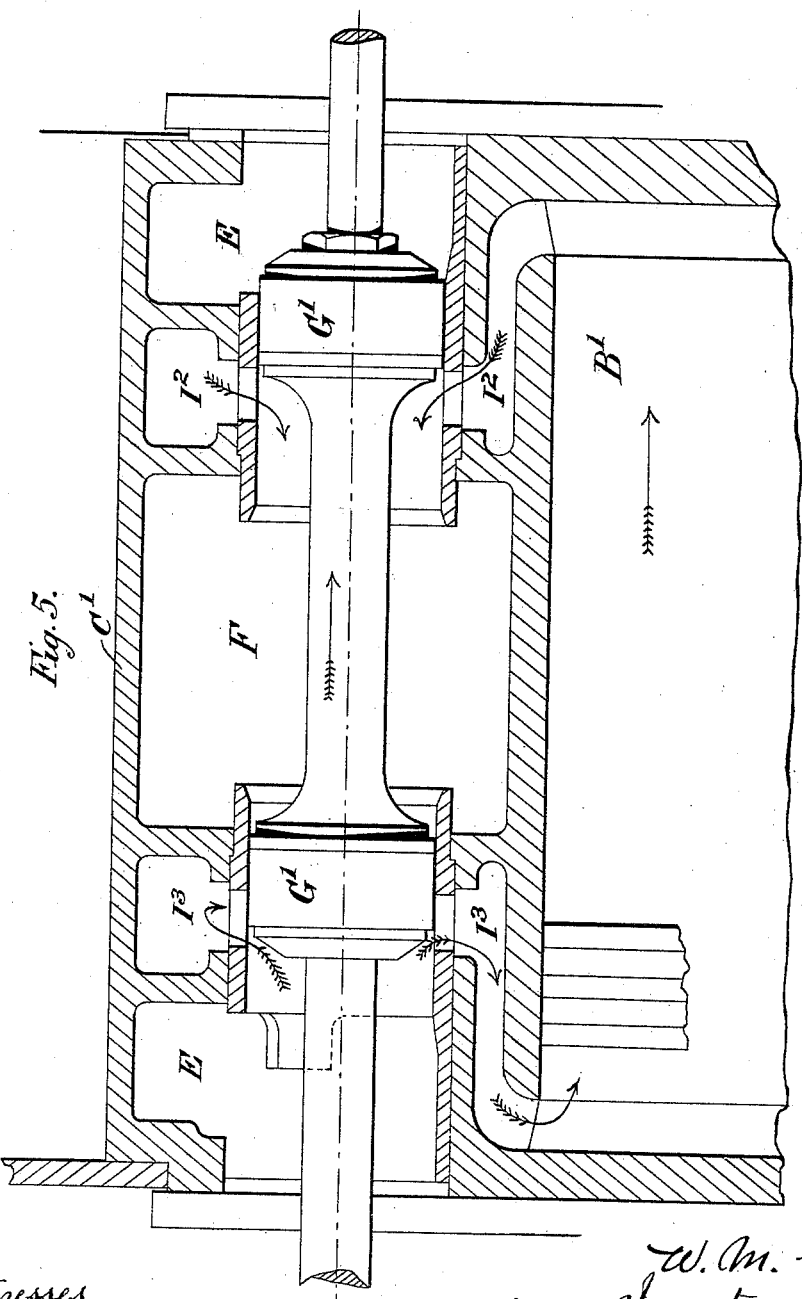
Witnesses
E. E. Duffy
H. E. Peeks
W. M. Smith
per Inventor.
O. E. Duffy
Atty (No Model.) 7 Sheets—Sheet 5.
W. M. SMITH.
COMPOUND ENGINE.
No. 464,833. Patented Dec. 8, 1891.
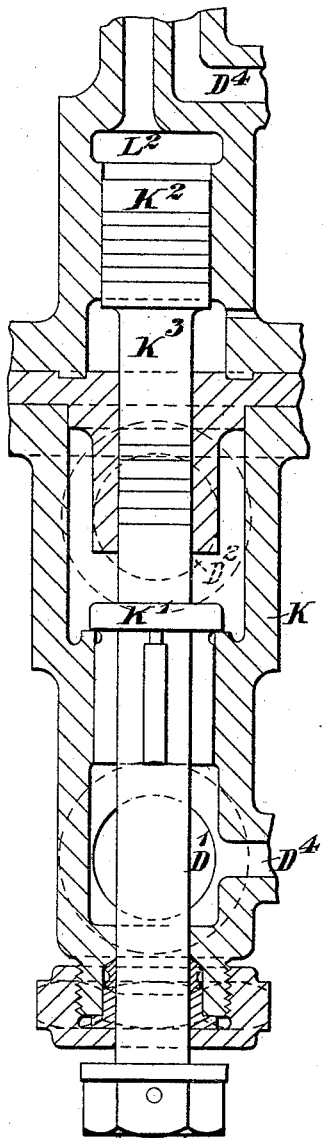
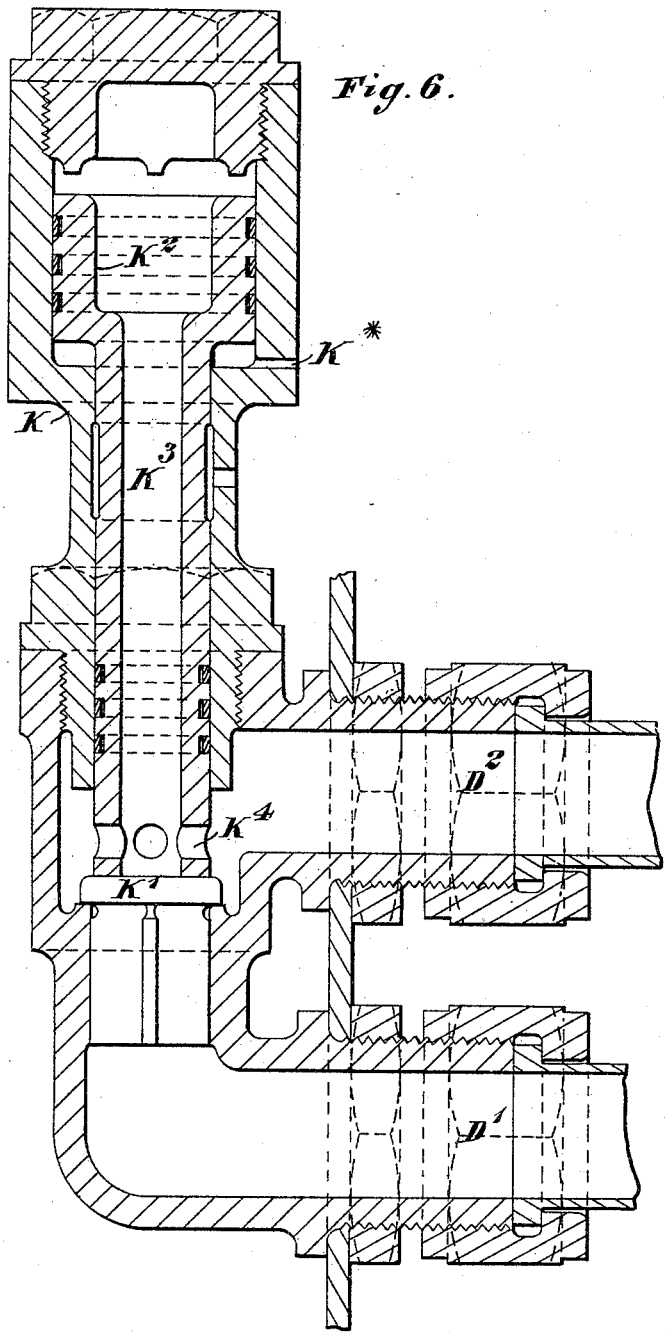
Fig. 10.
Fig. 6.
Witnesses
W. M. Smith
per Inventor.

(No Model.) 7 Sheets—Sheet 6.
W. M. SMITH.
COMPOUND ENGINE.
No. 464,833. Patented Dec. 8, 1891.
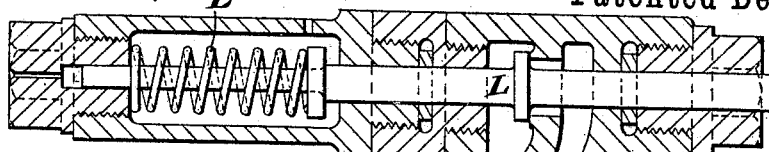
Fig. 7.
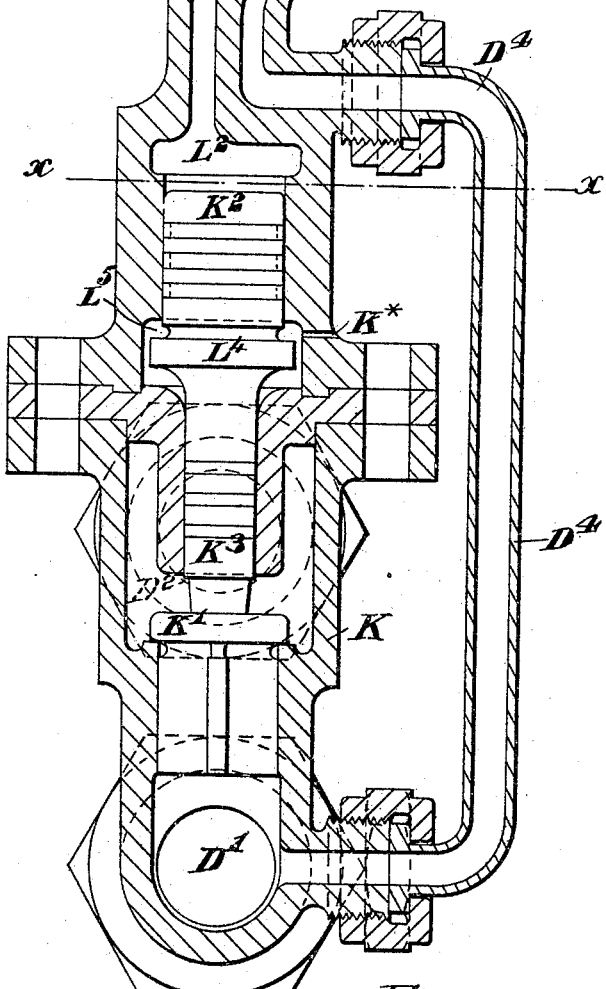
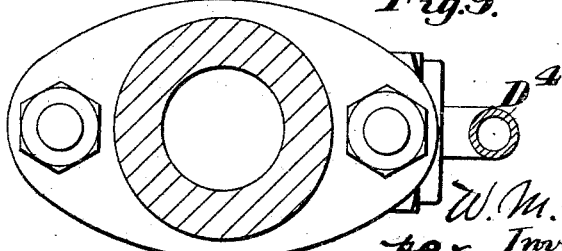
Fig. 9.
Witnesses
W. M. Smith
per Inventor.
THE NORRIS PETERS CO., PHOTO-LITHO., WASHINGTON, D. C.

(No Model.) 7 Sheets—Sheet 7.

W. M. SMITH.
COMPOUND ENGINE.

No. 464,833. Patented Dec. 8, 1891.

Witnesses
E. C. Duffy
Chas. M. Werle

W. M. Smith
Inventor
per O. E. Duffy
Atty

UNITED STATES PATENT OFFICE.

WALTER MACKERSIE SMITH, OF NEWCASTLE-UPON-TYNE, ENGLAND.

COMPOUND ENGINE.

SPECIFICATION forming part of Letters Patent No. 464,833, dated December 8, 1891.

Application filed June 19, 1891. Serial No. 396,869. (No model.)

*To all whom it may concern:*

Be it known that I, WALTER MACKERSIE SMITH, a subject of the Queen of Great Britain and Ireland, residing at Jesmond, Newcastle-upon-Tyne, in the county of Northumberland, England, have invented Improvements in Compound Engines, of which the following is a specification.

This invention has for its object improvements in compound engines, and has reference to means for enabling such engines to start easily and safely and for improving the working of the same. It is more particularly applicable to compound locomotive-engines, but may be applied to other descriptions of compound engines whether constructed with two or more cylinders.

According to this invention each end of the high-pressure cylinder of the compound engine is connected by a pipe or passage controlled by a non-return valve with the receiver of the engine, to which steam is admitted immediately the regulator or stop-valve is opened through an admission or starting valve, which closes as soon as a predetermined pressure is attained in the receiver. The arrangement is such that should the distributing-valve of the high-pressure cylinder cover both steam-ports of that cylinder at starting the piston thereof will be subject on both sides to the reduced pressure of the steam in the receiver, and will consequently be practically in equilibrium, and the steam-distributing valve of the low-pressure cylinder will then admit steam from the receiver to that cylinder and cause the engine to move. Should, however, both low-pressure steam-ports be closed at starting then the high-pressure distributing-valve will admit high-pressure steam to one end of the high-pressure cylinder, thereby destroying the equilibrium of the pressure on opposite sides of the piston therein and causing the latter to move, at the same time causing the non-return valve at that end of the cylinder to close and cut off communication with the receiver. The other end of the cylinder will, however, be connected with the receiver, so that the pressure to which the high-pressure piston will be subjected at starting will be practically only equal to the difference between the boiler-pressure and the receiver-pressure, so that the sudden and severe strain that would otherwise be thrown on the high-pressure piston and the parts connected therewith during the first part of the stroke will be obviated more or less. After the engine has started the first exhaust of steam from the high-pressure cylinder creates a pressure in the receiver sufficient to keep the admission or starting valve closed, and the engine commences to work compound.

Figure 8:
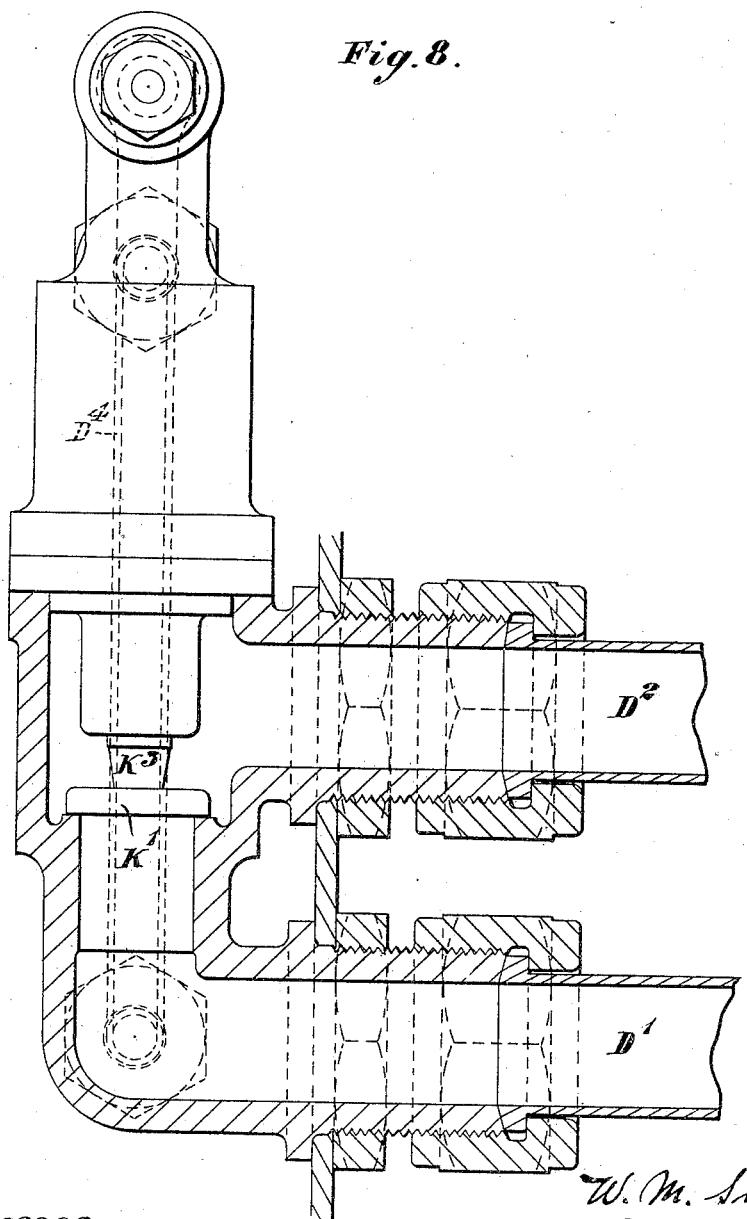

In the accompanying drawings, Figure 1 is a transverse vertical section through the smoke-box, showing the high and low pressure cylinders and steam-pipes of a compound locomotive embodying my invention. Fig. 2 is a longitudinal section thereof along the axis of the high-pressure cylinder, and Fig. 3 is a horizontal section through the valve-chests. Fig. 4 is a longitudinal central section through the valve-chest and adjacent parts of the high-pressure cylinder, and Fig. 5 is a similar view of the valve-chest and adjacent parts of the low-pressure cylinder. Fig. 6 is a vertical central section of one arrangement of valve according to this invention for admitting high-pressure steam to the receiver. Fig. 7 is a vertical central section, and Fig. 8 is a part vertical section, of another arrangement of valves, the said sections being taken in planes at right angles to one another. Fig. 9 is a horizontal section on the line $x\ x$, Fig. 8. Fig. 10 is a vertical central section showing a further modification thereof. Figs. 1, 2, and 3 are drawn to a smaller scale than the remaining figures.

Referring to Figs. 1 to 5, inclusive, A is the shell of the smoke-box; B, the high-pressure cylinder; B', the low-pressure cylinder; C, the high-pressure valve-chest; C', the low-pressure valve-chest; D, the main steam-pipes, and D' D² auxiliary steam-pipes, which serve, as hereinafter described, to supply steam through an admission-valve situated at D³ to the receiver E of the engine. F is the exhaust or blast pipe of the locomotive. The valve-chest C, (shown more clearly in Fig. 4,) in which is situated the distributing-valve G, is provided with a pair of non-return valves H H', controlling openings H², that are situated between the steam-ports I I', respectively, of the high-pressure cylinder and the receiver E of the engine. The valve-chest C' of the low-pressure cylinder B' is provided with two distributing-valves G', Fig. 3, controlling the low-pressure steam-ports I² I³ and opening the same alternately to the receiver E and to the exhaust F. The distributing-valves G and G' are shown as of the piston-valve type; but other forms of distributing-valves can be used, if desired. Figs. 4 and 5 show the relative positions of the distributing-valves G G' of the high and low pressure cylinders, respectively, the piston of the high-pressure cylinder being shown at or near the left-hand end of its stroke when moving to the left, and the low-pressure piston being shown at or near the left-hand end of its stroke when moving to the right, the cranks being set at right angles. The relative direction of motion of the valves and pistons and the direction of flow of steam are indicated by arrows. It will be seen that as the valves are set the high-pressure steam-space J is shut off from both ends of the high-pressure cylinder B.

In order to start the engine, steam is admitted to the steam-space J from the main steam-pipe D and to the receiver E from the auxiliary steam-pipes D' D², the pressure in the latter case being diminished on passing the admission or reducing valve at D³. The steam-port I, Fig. 4, being open to the receiver, steam from the said receiver will pass direct to the corresponding side of the high-pressure piston B², the pressures on the top and bottom of the valve H being then equal. The communication between the steam-chest J and the steam-port I', however, being closed by the distributing-valve G, the pressure of steam on the under side of the non-return valve H' will be greater than that on its upper side. Consequently the said valve will be raised and steam will pass through I' to the left-hand side of the piston B², thereby placing the pressure on the two sides of the said piston nearly in equilibrium.

In Fig. 5 the communication between the receiver E and the left-hand port I³ is shown opened by the distributing-valve G', so that steam will pass from the receiver E to the left-hand side of the low-pressure piston and cause the engine to move, the right-hand port I² at this time being open to the exhaust F.

Should both ports of the low-pressure cylinder be closed at starting, then high-pressure steam will be admitted to one end of the high-pressure cylinder—say, for example, to the end at which the valve H' is situated. This will immediately close the said valve; but, the other side of the piston being open to the receiver through the distributing-valve and the valve H, the high-pressure piston will not practically be subjected to a greater pressure than that due to the difference between the boiler-pressure and the receiver-pressure.

The non-return valves H H' are shown as of the "mushroom" type, the connection to the steam-ports being by passages formed in the casting of the cylinders. Various other forms of non-return valves—such as foot-valves—may, however, be used, and the connections may be made by means of pipes communicating with the receiver and the ends of the cylinder. It is preferable, however, that these valves should be automatic in their action, so as to open by the steam-pressure in the receiver to admit steam to both sides of the high-pressure piston and to close by the increased pressure of steam on the admission of high-pressure steam to the cylinder by the distributing-valve G. The position of the reversing-rod in full gear or otherwise is immaterial to the action of these valves, there being no connection between them. Should the pressure in the receiver during the working fall below the normal degree which it is desired to maintain therein, high-pressure steam will be automatically admitted thereto, as hereinafter described, to restore the said pressure through the auxiliary steam-pipes D' D² and the valve situated at D³. In one arrangement of valves for this purpose, and which is shown in Fig. 6, the boiler-pressure (or the boiler-pressure modified by the action of the regulator) acts upon a valve or piston K', which I will call the "admission-valve," and the pressure in the receiver acts on another valve or piston K², which I will call the "cut-off" valve. The two valves are fitted in a suitable casing K and are coupled or placed in working connection with each other by a hollow stem K³, provided with lateral perforations K⁴, or by other suitable means, provision being made—as, for example, by a hole K<sup>x</sup>—for the escape of steam that may leak past the cut-off valve. The boiler-pressure in the pipe D', acting on the valve K', tends to raise the same, while the pressure in the receiver through the pipe D² acts on the valve K² and on the upper side of K', the effect in each case being proportional to the pressure and to the area on which the same acts. The areas of the valves are so proportioned that the admission-valve is closed at a given relative difference of pressure between the steam in the steam-pipe and that in the receiver. When the pressure in the receiver falls below its normal degree relatively to that of the boiler-pressure, the steam-pressure in the pipe D' will raise the valve K' and high-pressure steam will pass into the pipe D², thereby augmenting the pressure therein until the same is sufficient to again close the valve K'.

In some cases, instead of the pressure in the receiver being maintained such that it shall be a given proportion of the pressure in the steam-pipe, it is desirable that it should be maintained constant through a considerable range of boiler-pressure. To this end the arrangement shown in Figs. 7, 8, and 9 may be employed, in which the cut-off valve K² is arranged to be controlled not by the pressure in the receiver, but by pressure of steam admitted to a chamber L² through the steam-pipe D' and a pipe D⁴ past a loaded valve L, (hereinafter called the "controlling-valve.") This valve is by preference loaded with an adjustable spring L' and reduces the pressure of the steam which passes through it by a definite amount. It is this pressure that acts on the cut-off valve or piston K² against the pressure of the steam in the steam-pipe on the admission-valve K'. As the controlling-valve L is subjected on one side to a constant load and allows steam to pass it from the boiler until the pressure exerted on the cut-off valve equals the boiler-pressure minus a pressure equivalent to the load placed on the valve by the spring, it will be seen that the pressure exerted on the cut-off valve will increase or decrease as the boiler-pressure increases or decreases. The result is that the increased or decreased boiler-pressure, tending to lift the admission-valve and by its means the cut-off valve, is balanced by the increased or decreased pressure acting on the cut-off valve and tending to close the admission-valve, so that a constant pressure is maintained on the back of the admission-valve and the pressure in the receiver will be maintained practically constant. In the operation of this arrangement steam will pass into the chamber L² until it attains sufficient pressure therein to push, with the assistance of the spring L', the valve L against its seat. Obviously this obtains when the pressure of steam in L² exceeds the difference between the boiler-pressure and the pressure on the valve L due to the spring L'. In other words, the steam in the chamber L² has a pressure less than the boiler-pressure by a definite amount depending upon the spring. This pressure acts on the upper side of the cut-off valve or piston K², the lower side of which in this instance is only exposed to atmospheric pressure through the orifice K$^x$. The cut-off valve or piston K² is in connection by the spindle K³ with the admission-valve K', the two being of equal area.

The spring L' of the controlling-valve L may be graduated so that the pressure in the receiver can be increased when it is desired to increase the power of the engine. For this purpose the parts may be so arranged that they can be conveniently worked from the foot-plate.

L⁴ is a collar on the spindle K³. It is arranged to work in a chamber L⁵ in communication with the atmosphere and serves to limit the upward movement of the valve K'. A pressure-gage may, moreover, be provided in any convenient part to indicate to the engine-driver the pressure of steam in the receiver.

By increasing the load on the controlling-valve L the pressure in the receiver can be increased when it is desired to increase the power of the engine.

By the arrangements described with reference to Figs. 7, 8, and 9 a desired constant pressure can always be maintained in the receiver and on the low-pressure piston independently of the rise or fall of the boiler-pressure so long as that pressure is above the pressure required in the receiver. The power developed by the high and low pressure cylinders can also by this means be regulated and made equal, or the power developed by the low-pressure cylinder can be made greater than that developed by the high-pressure cylinder. The steam emitted from the exhaust-pipe will also be constant for any given point of cut-off, so that the action of the blast on the fire will be maintained correspondingly constant during the working of the engine.

In the modified valve arrangement shown in Fig. 10 the cut-off valve or piston K² is equal in area to the difference between the areas of the valve K' and the spindle K³. In this case the pressure in the receiver would also be maintained constant and practically equal to that which would be required to lift the valve L against the spring L'. As a matter of fact it would be greater than this latter pressure by a definite amount which is equal to that of an atmosphere.

What I claim is—

1. In a compound engine, the combination, with high and low pressure cylinders, distributing-valves therefor, and a receiver located between said cylinders, of passages connecting said receiver with each end of said high-pressure cylinder, and valves arranged to control each of said passages, substantially as herein described.

2. In a compound engine, the combination of high and low pressure cylinders, steam-distributing valves therefor, a receiver between said cylinders, an admission-valve adapted to automatically admit steam from the boiler to said receiver, passages connecting said receiver with each end of said high-pressure cylinder, and valves adapted to automatically open and close said passages, substantially as herein described, for the purpose specified.

3. In a compound engine, the combination, with the high and low pressure cylinders, steam-distributing valves therefor, and a receiver between said cylinders, of a reducing-valve for automatically admitting boiler-pressure steam at a reduced pressure to said receiver, and comprising an admission-valve subject on one side to the action of boiler-steam, a cut-off valve subject to the action of steam at a lower pressure, and a loaded controlling-valve adapted to control said steam at lower pressure, substantially as herein described, for the purpose specified.

4. In a compound engine, a reducing-valve for automatically admitting boiler-steam at a reduced pressure to the engine-receiver, and comprising a casing having an inlet for high-pressure steam, and outlet to said receiver, an admission-valve subject on one side to the action of boiler-steam and on the opposite side to the pressure of steam that obtains in said receiver, a cut-off valve arranged to act against so as to close said admission-valve, and a loaded controlling-valve for regulating the pressure of steam to act on said cut-off valve, substantially as herein described, for the purposes specified.

In testimony whereof I have signed my name to this specification in the presence of two subscribing witnesses.

WALTER MACKERSIE SMITH.

Witnesses:
D. F. MACK,
88 *Park Road, Newcastle-upon-Tyne.*
R. T. BRANKSTON,
36 *Hawthorn Street, Newcastle-upon-Tyne.*